No. 616,401. Patented Dec. 20, 1898.
E. H. CALLAWAY.
MOLDING PRESS.
(Application filed Oct. 15, 1897.)
(No Model.) 5 Sheets—Sheet 1.
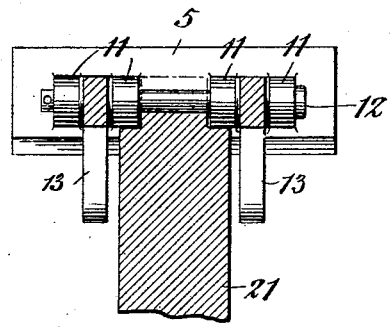
Fig. 13.
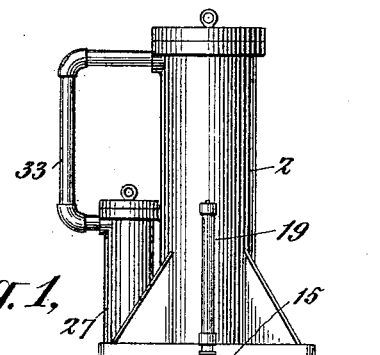
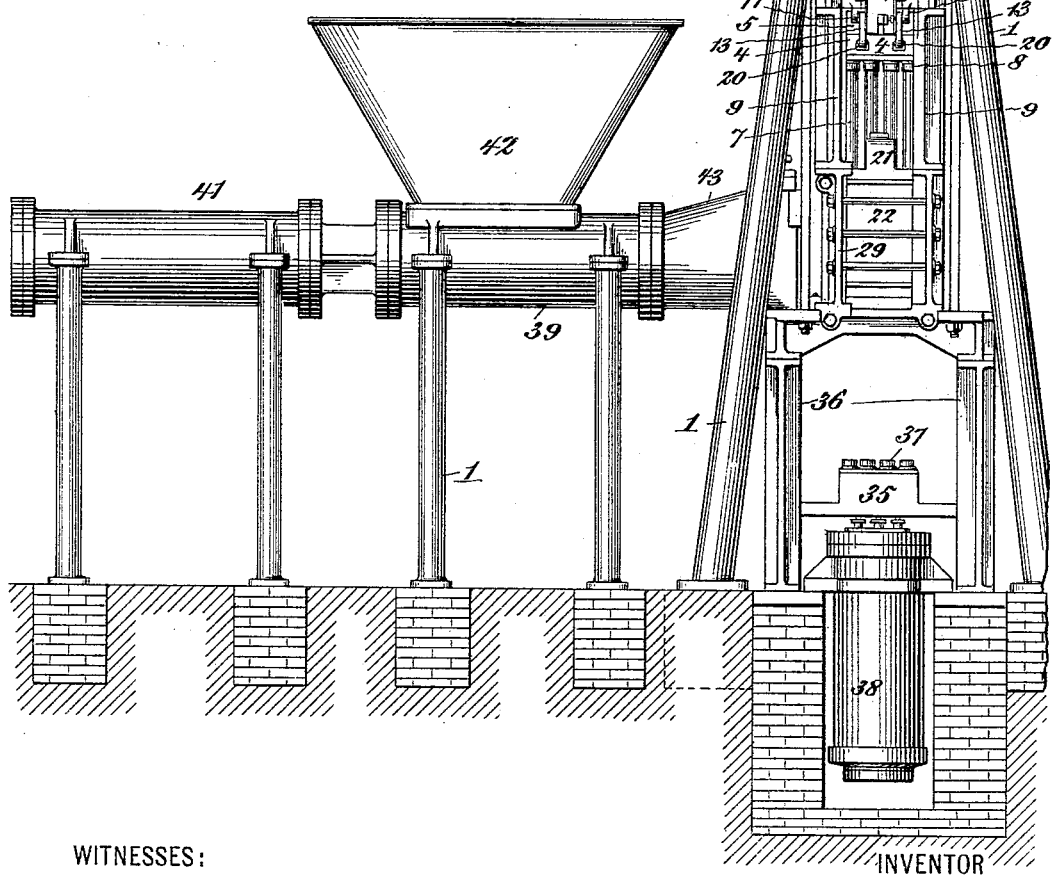
Fig. 1.
WITNESSES:
INVENTOR
Edward H. Callaway
BY
Witter & Kenyon
ATTORNEYS No. 616,401. Patented Dec. 20, 1898.
E. H. CALLAWAY.
MOLDING PRESS.
(Application filed Oct. 15, 1897.)

(No Model.) 5 Sheets—Sheet 3.

WITNESSES:

INVENTOR
Edward H. Callaway
BY
Witter Kenyon
ATTORNEYS.

No. 616,401. Patented Dec. 20, 1898.
E. H. CALLAWAY.
MOLDING PRESS.
(Application filed Oct. 15, 1897.)
(No Model.) 5 Sheets—Sheet 4.
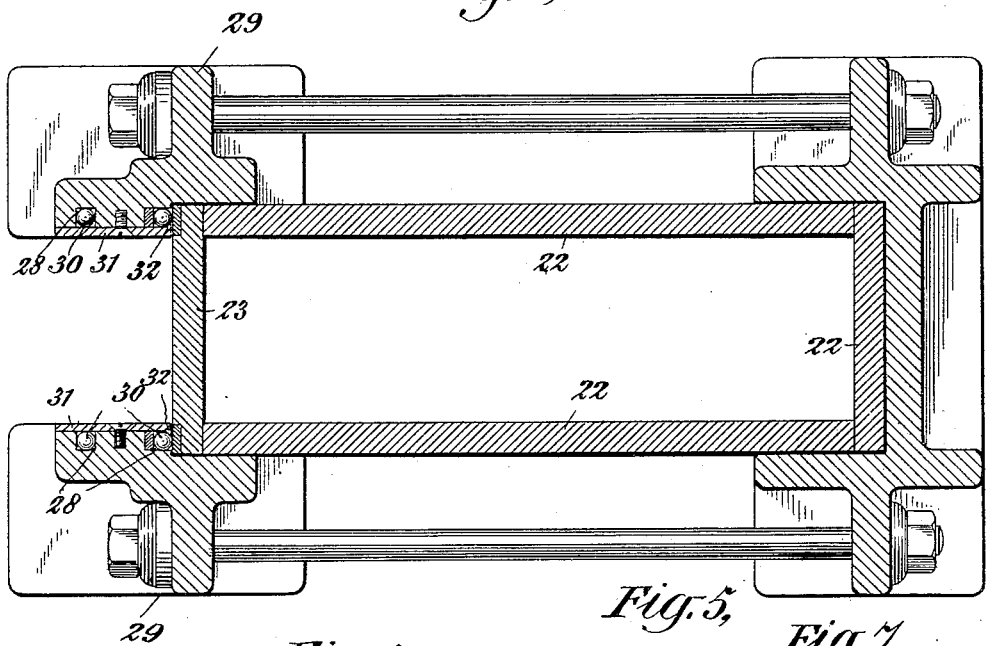
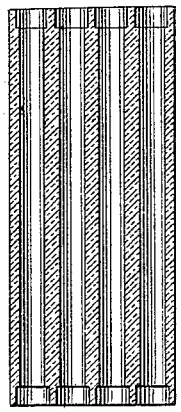
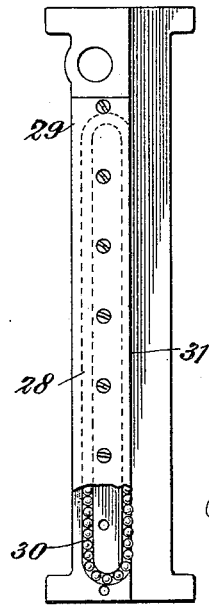
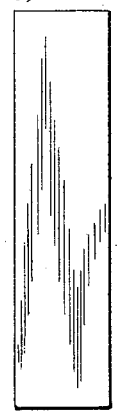
WITNESSES:
INVENTOR
Edward H. Callaway
BY
Witter & Kenyon
ATTORNEYS No. 616,401. Patented Dec. 20, 1898.
E. H. CALLAWAY.
MOLDING PRESS.
(Application filed Oct. 15, 1897.)
(No Model.) 5 Sheets—Sheet 5.
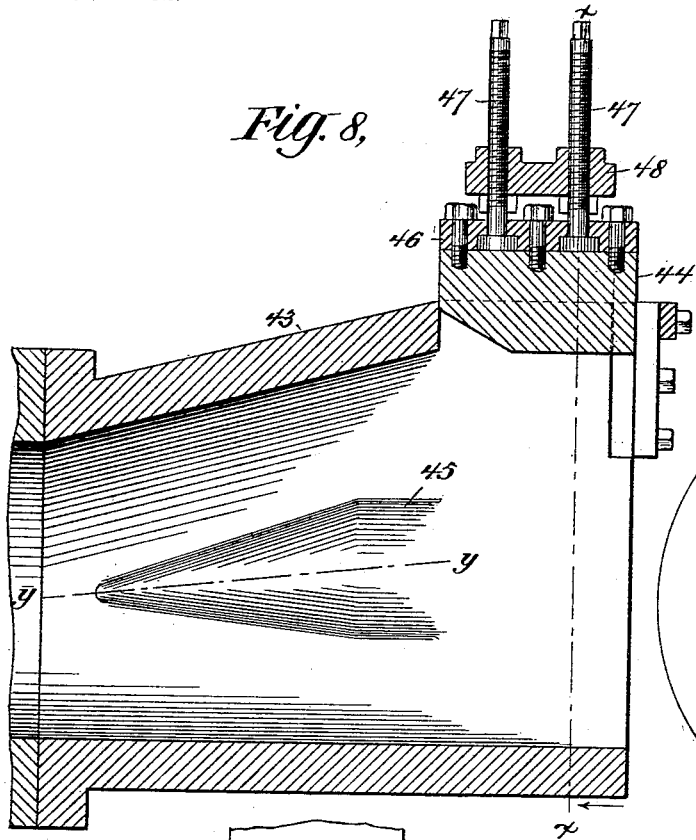
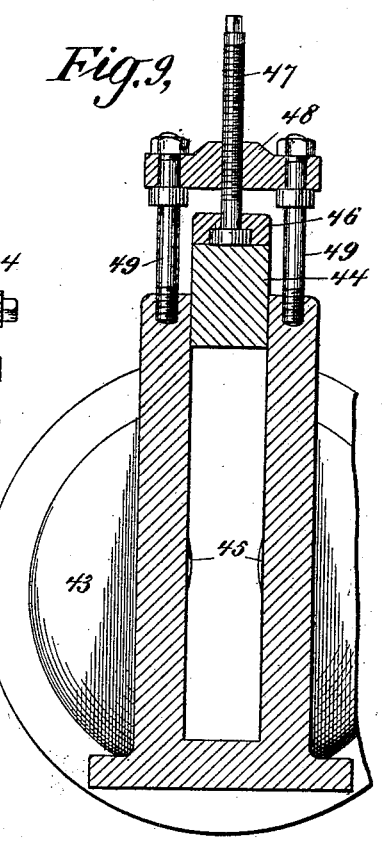
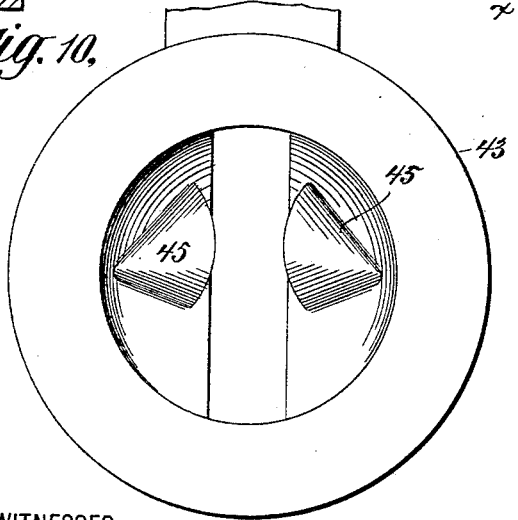
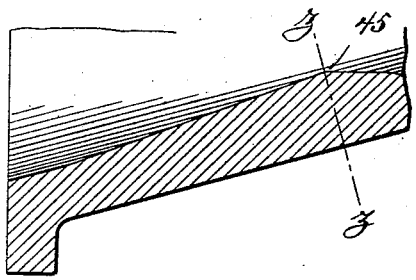
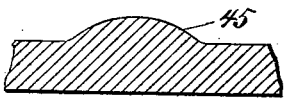
WITNESSES:
INVENTOR
Edward H. Callaway
BY
Witter Kenyon
ATTORNEYS.

UNITED STATES PATENT OFFICE.

EDWARD H. CALLAWAY, OF NEW YORK, N. Y.

MOLDING-PRESS.

SPECIFICATION forming part of Letters Patent No. 616,401, dated December 20, 1898.

Application filed October 15, 1897. Serial No. 655,270. (No model.)

*To all whom it may concern:*

Be it known that I, EDWARD H. CALLAWAY, a citizen of the United States, residing in New York, (Rosebank,) in the county of Richmond and State of New York, have invented a new and useful Improvement in Molding-Presses, of which the following is a full, clear, and exact specification, reference being had to the accompanying drawings, which form a part hereof.

My invention relates to presses for molding blocks or sections provided with perforations out of clay or other suitable plastic material.

My invention is especially adapted for use in making sections for electrical conduits which are adapted to be placed end to end and form an insulating covering or conduit for wires and cables. Certain parts of my invention, however, are capable of being used in presses for making other forms of blocks—such, for example, as solid blocks or bricks having no perforations.

The object of my invention is to provide an apparatus which can be easily and accurately controlled and operated, which will produce sections of uniform and accurate size and shape, which will compress the material uniformly at all parts, so as to make the completed article homogeneous, and therefore strong and durable, which will operate with a fair degree of rapidity and in which the parts are made to move with the least possible friction and the least possible amount of strain and wear, and which will be economical in the power consumed and the results accomplished.

My invention is fully shown in the accompanying drawings, in which—

Figure 2:
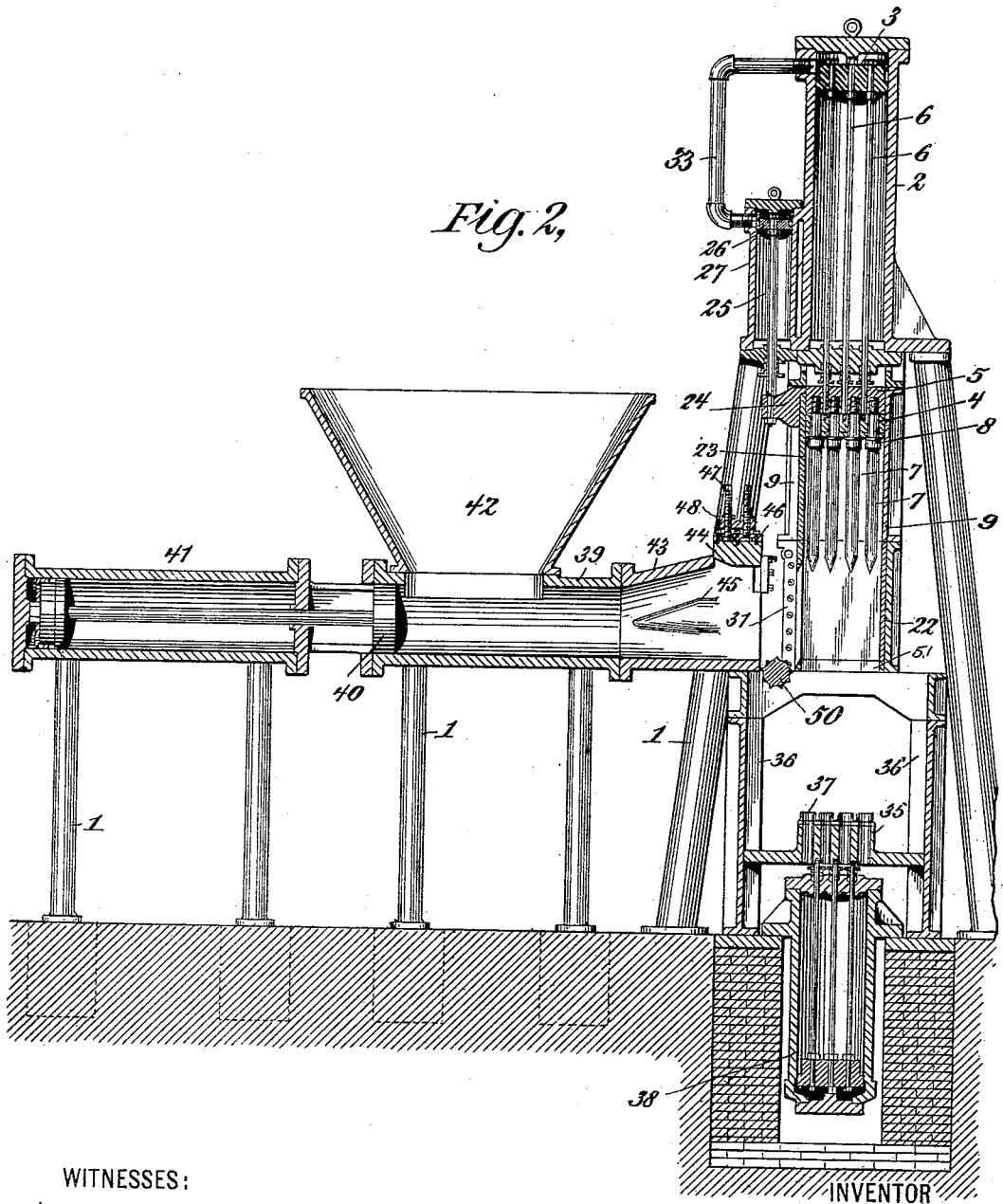
Figure 3:
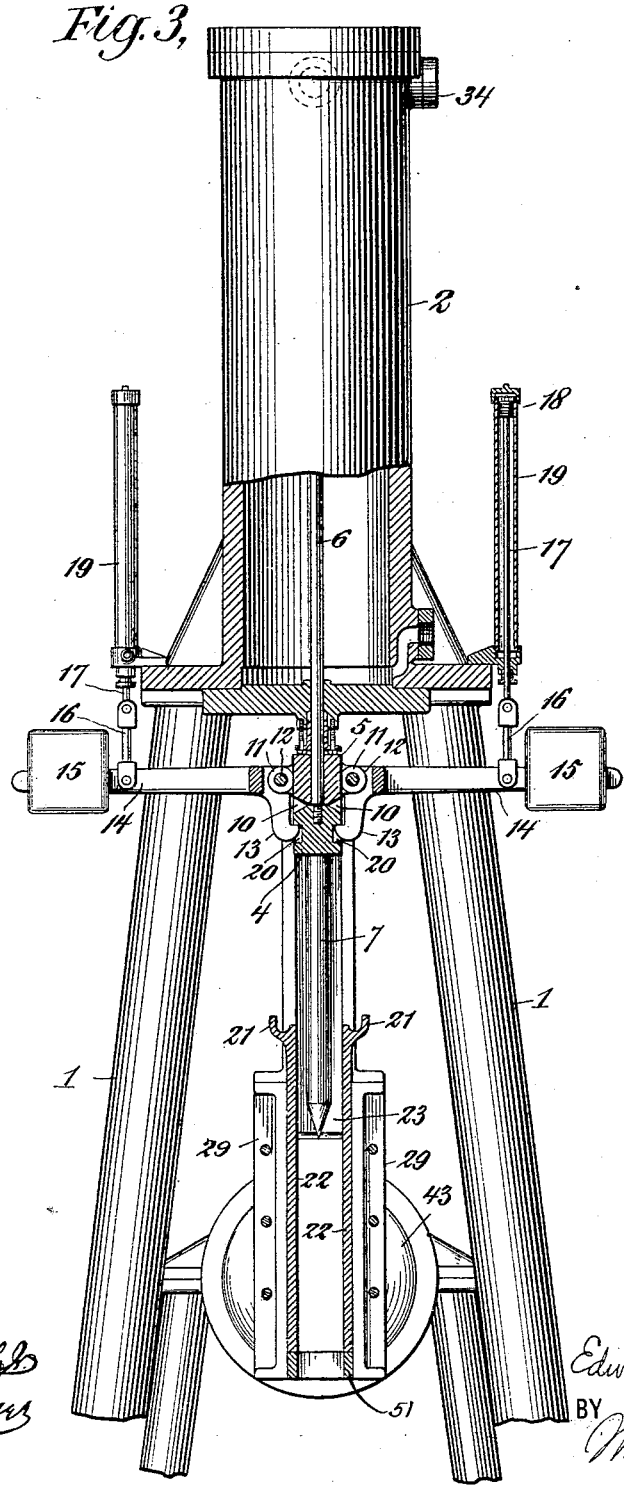

Figure 1 is a front elevation view. Fig. 2 is a vertical longitudinal section of Fig. 1. Fig. 3 is an end view, partly in section, looking from the right in Fig. 1, the lower part of the press not being shown. Fig. 4 is a horizontal section of the mold or mold-box. Fig. 5 is a face view of that part of the frame containing the ball-race for the sliding knife. Fig. 6 is a vertical section of an article such as the press is designed to form. Fig. 7 is a side view of this completed conduit-section. Fig. 8 is a vertical longitudinal section of the forming-die of the feed-cylinder. Fig. 9 is a vertical cross-section on the line $x\,x$ of Fig. 8, looking in the direction of the arrow shown in Fig. 8. Fig. 10 is an end view of the forming-die of the feed-cylinder, looking in a direction opposite to that shown by the arrow in Fig. 8. Fig. 11 is a longitudinal partial section on the line $y\,y$ of Fig. 8 to show the shape of the spreading device. Fig. 12 is a cross-section on the line $z\,z$ of Fig. 11. Fig. 13 is a detail view to show the form of stop or rest upon which the cross-head is supported at the bottom end of its stroke.

Similar numbers refer to similar parts in the different figures.

My invention consists, first, in the combination, in such a press, of a mold in which the material is compressed, a cross-head above the mold adapted to carry and support the core-rods which form the perforations in the completed article, core-rods carried by the cross-head, a plunger below the cross-head, which is provided with perforations through which the core-rods pass, so as to enable the plunger to slide up and down on the core-rods, and suitable means for moving the cross-head, core-rods, and plunger down toward the mold until the core-rods are passed through the mold and brought into operative position, and means for thereafter forcing the plunger still farther down along the rods, so as to compress the material around the rods, whereby the core-rods are passed through the material and brought into the proper position before the material is subjected to the compression which molds it into shape.

My invention also consists in providing means for connecting and disconnecting the cross-head and plunger, so that they can be connected and forced down together by the means that reciprocates the plunger until the core-rods are in proper place and can then be disconnected and the plunger forced farther down to do the compression and whereby when the plunger is raised it will carry up with it the cross-head and core-rods. In my complete invention this means consists of a clutching mechanism adapted to automatically clutch the cross-head and the plunger together when the plunger is raised. The special form of clutching mechanism shown and described herein forms one part of my invention.

My invention also consists in combining with the parts already referred to or some of them a second plunger at the other end of the mold, which is also perforated so as to receive the ends of the core-rods when they are forced into operative position, and suitable means for forcing this second plunger against the material, whereby the material is compressed at both ends around the rods, resulting in a more even density of the product and by which the article after being formed can be readily removed from the mold.

My invention also consists in employing a sliding knife which is adapted to cut off the material fed into the mold and after the cutting operation has been completed to form one side of the mold and a piston connected with the knife and working in a suitable cylinder and an open pipe or passage-way connecting the end of the knife-cylinder with the end of the main working cylinder, whereby power which is applied to the piston in the main cylinder will at the same time be exerted upon the piston in the knife-cylinder and will operate both, but will operate the knife-piston first by reason of its offering less resistance, as a result of which the knife will be caused to cut off the material first, and then the material will be compressed by the plunger.

My invention also consists in the combination, with the sliding knife, of a ball-race adjacent to the exterior surface of the knife, and friction-balls in the said race upon which the knife rides, as a result of which the friction on the knife is very much reduced and economy thereby secured.

My invention also consists in the special construction of the ball-race and the parts connected therewith.

My invention also consists in the combination, with the molding-box or molding-chamber and the compression devices, of a feed-cylinder into which the clay or other material is first introduced and from which the material is forced by suitable means into the molding-chamber, the feed-cylinder being provided with a forming-die at its discharge end adapted to give the desired form to the material as it is being pressed into the molding-chamber and the forming-die being provided with a regulating plate or block which is adjustable and by means of which the size of the block or piece of material fed into the mold-box is regulated, so as to be made to approximate as nearly as possible to the ultimate size and shape to be given to the completed article, whereby uniformity of compression and of product are secured. In the completed form of my feed-cylinder I employ a spreading device in the forming-die to spread the material in a vertical direction and also a measuring-roller between the forming-die and the mold, by means of which the length of material fed into the mold-box can be definitely measured and regulated.

My invention also consists in certain other features of construction and combinations of parts, hereinafter described and claimed.

Referring to the drawings, 1 is the frame of the machine, which is made in any suitable form, such as will give sufficient strength to support the different parts of the machine. This frame I prefer to mount upon a substantial foundation, such as is illustrated in the drawings.

2 is the main hydraulic cylinder, in which works the piston 3, which operates the molding-plunger 4 and the cross-head 5, which is above the plunger and which is adapted to be connected with or disconnected from the plunger, as hereinafter explained. The piston 3 is connected with the plunger 4 by means of the connecting-rods 6, which pass through suitable stuffing-boxes in the bottom head of the cylinder 2. These connecting-rods also pass through perforations in the cross-head 5, so that the connecting-rods may slide in their bearings in the cross-head. The cross-head 5 supports and carries the core-rods 7. These core-rods are fastened at their upper ends to the cross-head in any suitable manner, as by being screwed into the cross-head. The core-rods pass through perforations in the plunger 4, so that the plunger can be moved up and down upon the core-rods. In the complete form of my invention the plunger is provided on its lower face with a die-plate 8, which is given such a form that when it is forced against the clay the upper end of the completed block will be molded so as to have the desired recesses or projections around the ends of its perforations, whereby the blocks can be more readily joined in laying the conduit. The number of core-rods to be used is regulated according to the number of perforations desired in the completed article. I prefer to make the core-rods pointed at their lower ends, so that they will readily pass through the material and into the perforations of the lower plunger. The cross-head and the upper plunger are adapted to move in guide-plates 9 at their ends, made of any suitable form or construction. A cross-section of the cross-head and the plunger is shown in Fig. 3. The lower corners of the cross-head and the upper corners of the plunger are preferably beveled, so as to form spaces 10, so that if any of the clay is forced through the perforations in the plunger between the walls of those perforations and the core-rods a space for this overflow will be provided when the cross-head and plunger are brought together.

A clutching mechanism is provided for connecting and disconnecting the cross-head and the plunger. This is fully shown in Fig. 3. This mechanism is constructed as follows:

11 11 are lugs which project from both sides of the cross-head and are provided with perforations in which the pin 12 is supported.

13 13 are pawls pivoted so as to turn on the pin 12, and these pawls are connected with levers 14 14, provided with the weights 15 at their outer ends. The levers 14 are connected, by means of links 16 and a piston-rod 17, with a piston 18, working in a small hydraulic cylinder 19. The plunger is provided with grooves 20, with which the ends of the pawls are adapted to engage.

21 is a grooved rest or support adapted to receive the pin 12 when the cross-head and plunger are forced down and to act as a stop to prevent the pin from being forced down any farther and to hold the cross-head while the plunger is being forced farther down, so as to compress the material in the cylinder. The weights 15 depressing the outer ends of the lever 14 tend to hold the pawls normally in engagement with the grooves of the plunger, so as to hold the plunger and cross-head together. When the plunger is forced down, the cross-head moves down with it, and as the pistons 18 are free to move down in their respective cylinders they move down at the same time with the cross-head and plunger, as a result of which the pawls are kept in engagement with the plunger. When the pins 12 have reached the stops 21, the power is shut off from the main hydraulic cylinder and power is introduced into the cylinders 19 underneath the pistons 18, so as to raise those pistons and thereby withdraw the pawls from the grooves 20, thereby unlocking the plunger from the cross-head. The power is again applied in the main cylinder and the plunger is forced down into the molding-chamber to compress the material, the cross-head meanwhile being supported on the rest 21. When the plunger is raised, it carries up with it the cross-head, and as the cross-head is raised the pawls are automatically engaged with the grooves, since the weights 15 will keep the outer ends of the levers 14 from moving upward until the teeth of the pawls have been pressed in against the plunger, after which the pistons 18 are moved up in the cylinders 19, the whole clutching mechanism rising with the cross-head and plunger.

22 22 are the fixed or stationary sides of the mold, which are held in place by the frame-pieces, as clearly shown in Fig. 4. The frame-pieces are preferably bolted together, as shown in Fig. 4.

23 is a sliding knife which is reciprocated up and down in guides in the frame of the machine, as shown in Fig. 4. This knife is provided with a cutting edge at the lower end and is connected at the upper end by means of the cross-head 24 with the piston-rod 25, connected with the piston 26 in the knife-operating cylinder 27. The knife is operated by applying power to the piston 26.

28 is a raceway formed in the frame-piece 29, which is filled with friction-balls 30, which are free to move in either direction in the raceway. These balls are held in the raceway by the clamping-plate 31, which is screwed or otherwise suitably fastened to the frame-piece 29, and which is provided at its inner end with an inwardly-extending lip 32, adapted to overlap the friction-balls and so prevent them from falling out of the raceway in a sidewise direction. The friction-balls 30 project out from beyond the edge of the plate 31, so that the knife rides upon these friction-balls and does not bear against the plate 31. By this means the friction upon the knife is materially reduced and the operation of the knife is very much facilitated. A partial horizontal section of the raceway and knife, showing the friction-balls bearing against the knife, is seen in Fig. 4, and a front view of the raceway is shown in Fig. 5.

33 is a connecting-pipe connecting the upper ends of the main hydraulic cylinder and the knife-operating cylinder above the pistons.

34 is the inlet or supply pipe at the upper end of the main hydraulic cylinder. It will be apparent that when power is applied above the main piston 3 this power will be exerted at the same time on top of the piston 26, and as there is less resistance against the piston 26 and its connected knife the knife will be first driven down and made to cut off the material before the plunger is made to do its work of compression, so that the material is cut off before the plunger begins to operate upon the material in the mold, and there is therefore no danger that the plunger will tend to force the material back through the supply-opening before that opening has been fully closed by the knife. The lower ends of the cylinders 2 and 27 may be connected in a similar way, so that the pistons 3 and 26 will be raised at the same time.

35 is a second plunger, which works at the lower end of the mold and is adapted to be raised, so as to form the bottom of the mold during compression. For this reason the plunger is adapted to fit the lower end of the mold nicely, but so as to be capable of moving up and down therein. The plunger 35 is provided with perforations of such a size and so placed as to receive the lower ends of the core-rods, so that the plunger can move up and down upon these rods. The plunger 35 slides in guides or ways 36, attached to the frame of the machine. In the most complete embodiment of my invention I provide the plunger 35 with the die-plate 37, adapted to form the lower end of the compressed block in any desired way. The plunger 35 is operated by any suitable means, such as a piston working in a hydraulic cylinder 38 and connected with the plunger by suitable connecting-rods, as shown, passing through stuffing-boxes. The plunger 35 is adapted to be raised into such position as to close the lower end of the mold-box and support the block of material fed into the same and thereafter to be raised still farther, so as to compress the material at the lower end while it is being compressed above.

39 is a feed or supply cylinder from which the clay or other material is fed into the mold.

40 is the supply ram or plunger, which can be operated in any suitable way, as by a piston working in a hydraulic cylinder 41 and connected by suitable means with the supply-ram 40. If desired, a hopper 42 can be used with the feed-cylinder. The supply-cylinder is provided with a forming-die 43, which is placed at the end of the feed-cylinder next to the mold-box. This forming-die is clearly shown in Figs. 8 to 12. It is designed to give to the material before it is fed into the mold a form approximating that to be given to the completed article. For example, the outer end of the forming-die is cylindrical, as shown in Fig. 10, whereas the inner end is rectangular, as shown in Fig. 9. The forming-die is provided with a regulating plate or block 44 to regulate the size of the block fed into the mold, and with a spreading device 45 to spread the material in a vertical direction, so as to fill out the mouth of the forming-die and to distribute the material uniformly in the block. The construction of the regulating-block can be very much varied. In the form shown it is provided with a top plate 46, through which the set-screws 47 pass. The lower ends of the set-screws are enlarged and turn in recesses in the plate 46. The set-screws are supported in the cross-bar 48 and work in threaded perforations in the cross-bar. The cross-bar is supported upon the forming-die by the bolts 49, as shown in Fig. 9. It will be seen that by turning the set-screws the regulating-block can be raised or lowered, so as to shorten or lengthen the discharge-opening of the die. The regulating-block moves up and down in suitable guides, as shown. The form of the spreading device is clearly shown in Figs. 10 to 12. It is of a general conical shape at its outer end and at its inner end is more nearly cylindrical.

50 is a measuring-roller placed between the forming-die and the mold, the circumference of which is made just equal to the length of the material or block which is to be fed into the mold. In other words, the circumference of the measuring or feed roller is just equal to the interior length of the mold-box from end to end. Any suitable registering device can be used with this roller to indicate each revolution, so that the operator can tell when the roller has revolved once, and when, therefore, sufficient material has been fed in, and can then shut off the power from the feed-ram 40.

51 is a finishing-die forming the lower end of the mold. It is clearly shown in Figs. 2 and 3. It is made of a single piece of cast steel, having four sides and being rectangular in shape, so as to conform to the shape of the mold and to the outer surface or shape of the block which is being molded. On the side where the knife operates it is beveled at the upper end, as shown in Fig. 2, so as to receive the beveled end of the knife. When the block is forced out from the mold, if it is irregular in any particular this irregularity will be corrected by the die 51.

The operation of my improved press is as follows: The clay or other material is placed in the hopper 42 and introduced into the feed-cylinder 39. The regulating-plate 44 is set in such a position as to produce the proper-sized block of material for the mold. The plunger 35 is then raised far enough to cause its upper end to enter the mold and to form the bottom thereof, so as to receive and support the block of material introduced into the same. At this time the cross-head 5 and plunger 4 and the knife 23 are in their highest position. The material is then forced through the forming-die 43 over the measuring-roller 50 into the mold, the feed being stopped when the measuring-roller has made one revolution. Power is then applied above the piston 3 and at the same time above the piston 26 through the connecting-pipe 33. The plunger, cross-head, core-rods, and knife will all be forced down together until the core-rods have penetrated the material for a short distance, when the resistance exerted against these core-rods will become greater than the resistance exerted against the knife and the knife will be forced down to the limit of its stroke, cutting off the material in the mold-box. When the knife comes to rest, the plunger and cross-head and core-rods will be forced down, the core-rods passing through the material and entering the perforations in the lower plunger 35. If in passing through the material there is any tendency to bend or deflect the core-rods, their pointed ends will nevertheless enter the perforations of the plunger 35 and guide the core-rods back to their proper position. When the pin 12 and the lugs 11 11 have about reached the seat in the rest or support 21, the power is turned off from the main hydraulic system, so that the cross-head and plunger will no longer continue to descend. The power is then applied underneath the pistons 18 in the cylinders 19, causing those pistons to rise and withdrawing the pawls 13 from the grooves 20 in the plunger, and thereby disengaging the plunger from the cross-head. Power is again applied above the piston in the main hydraulic cylinder, and the plunger 4 is forced down along the core-rods on top of the material in the mold, so as to compress the same. At the same time power is applied to the second plunger 35, and it is forced upward in the mold, so that the material is compressed at both ends. Power is then applied on top of the piston in the hydraulic cylinder 38, and the bottom plunger 35 is drawn down for a short distance to enable a plain plate or board to be placed on top of it, after which the plungers 4 and 35 are again forced down, so as to push the completed block out of the mold. This can be lifted off from the plunger 35 by hand. The plunger 4 is then raised, and when it comes in contact with the cross-head it raises the cross-head at the same time and draws the core-rods out of the mold-box. As the cross-head rises the inner ends of the levers 14 are raised; but as the outer ends are held down by the weights 15 the upward motion of the cross-head tends first to engage the pawls in the grooves of the plunger, after which the clutching device is lifted with the cross-head. The pistons 18 rise in the cylinders 19. The cylinders 19 are provided with apertures at the upper ends to permit the escape of air or water. Whatever water was admitted to the lower end of the cylinders 19 in disengaging the clutch is then let out, and the apparatus is then ready for a second operation.

What I claim as new, and desire to secure by Letters Patent, is—

1. In a molding-press, the combination of a mold, a cross-head above the mold adapted to carry the core-rods, core-rods carried by the cross-head, a plunger below the cross-head and provided with perforations through which the core-rods pass, a bottom plate provided with holes to receive the lower ends of the core-rods and means for forcing the cross-head, core-rods and plunger down toward the mold until the core-rods are brought into operative position with their lower ends projecting into the holes in the bottom plate and means for thereafter forcing the plunger farther down along the rods so as to compress the material, substantially as set forth.

2. In a molding-press, the combination of a mold, a cross-head adapted to carry the core-rods, core-rods fastened to the cross-head, a plunger provided with perforations through which the core-rods pass, means for connecting and disconnecting the cross-head and plunger, and means for reciprocating the plunger, whereby the cross-head and plunger can be connected and together forced toward the mold until the core-rods are in position in the mold, and the cross-head and plunger can then be disconnected and the plunger forced into the mold so as to compress the material, substantially as set forth.

3. In a molding-press, the combination of a mold, a cross-head adapted to carry the core-rods, core-rods fastened to the cross-head, a plunger provided with perforations through which the core-rods pass, a clutching mechanism adapted to automatically clutch the cross-head and the plunger together when the plunger is raised, and means for disengaging the clutch when the plunger is lowered, and means for reciprocating the plunger, substantially as set forth.

4. In a molding-press, the combination of a mold, a cross-head adapted to carry the core-rods, core-rods fastened to the cross-head, a plunger provided with perforations through which the core-rods pass, a groove in the plunger, a pawl pivoted to the cross-head and tending normally to engage in the groove, and means for withdrawing the pawl from the groove and means for reciprocating the plunger, substantially as set forth.

5. In a molding-press, the combination of a mold, a cross-head adapted to carry the core-rods, core-rods fastened to the cross-head, a plunger provided with perforations through which the core-rods pass, a groove in each side of the plunger, pawls pivoted to the cross-head and adapted to engage in the grooves, levers connected with the pawls, weights on the levers tending to keep the pawls in engagement with the grooves, and pistons working in suitable cylinders and connected with the levers, for disengaging the pawls and means for reciprocating the plunger, substantially as set forth.

6. In a molding-press, the combination of a mold, a cross-head adapted to carry the core-rods, core-rods fastened to the cross-head, a plunger provided with perforations through which the core-rods pass, means for connecting and disconnecting the cross-head and plunger, a working cylinder, a piston in said cylinder, and connecting-rods connecting the piston and the plunger whereby the plunger can be reciprocated, substantially as set forth.

7. In a molding-press, the combination of a mold, a cross-head above the mold adapted to carry the core-rods, core-rods carried by the cross-head, a plunger below the cross-head and provided with perforations through which the core-rods pass, and means for forcing the cross-head, core-rods and plunger down toward the mold until the core-rods are brought into operative position and means for thereafter forcing the plunger farther down along the rods so as to compress the material, and a second plunger at the other end of the mold perforated so as to receive the ends of the core-rods when they are forced into operative position and means for forcing the second plunger against the material whereby the material is compressed at both ends, substantially as set forth.

8. In a molding-press, the combination of a mold, a cross-head adapted to carry the core-rods, core-rods fastened to the cross-head, a plunger provided with perforations through which the core-rods pass, means for connecting and disconnecting the cross-head and plunger, and means for reciprocating the plunger, and a second plunger at the other end of the mold perforated so as to receive the ends of the core-rods when they are forced into operative position, and means for forcing the second plunger against the material, and die-plates on the plungers, substantially as set forth.

9. In a molding-press, the combination of a mold, a cross-head adapted to carry the core-rods, core-rods carried by the cross-head, a plunger provided with perforations through which the core-rods pass, a working cylinder, a piston in said cylinder connected with the plunger, a sliding knife adapted to cut off the material fed into the mold and to then form one side of the mold, a working cylinder for said knife, a piston in the knife-cylinder connected with the knife, and an open pipe connecting the ends of the two cylinders beyond the pistons, whereby the same power will operate both pistons, but will operate the knife-piston first, substantially as set forth.

10. In a molding-press, the combination with a mold of a sliding knife adapted to cut off the material fed into the mold and to then form one side of the mold, means for reciprocating the knife, and a ball-race adjacent to the exterior surface of the knife and friction-balls in said race upon which the knife rides, substantially as set forth.

11. In a molding-press, the combination with a mold of the sliding knife 23 adapted to cut off the material fed into the mold and to then form one side of the mold, means for reciprocating the knife, the ball-race 28, the balls 30, and the plate 31 having the lip 32 adapted to hold the balls in the race, substantially as set forth.

12. In a molding-press, the combination of a mold, a cross-head adapted to carry the core-rods, core-rods fastened to the cross-head, a plunger provided with perforations through which the core-rods pass, a clutching mechanism for connecting and disconnecting the cross-head and plunger, means for reciprocating the plunger, a sliding knife adapted to cut off the material fed into the mold and then to form one side of the mold, means for reciprocating the knife, a ball-race adjacent to the exterior surface of the knife and friction-balls in said race upon which the knife rides, substantially as set forth.

13. In a molding-press, the combination of a mold, a cross-head adapted to carry the core-rods, core-rods carried by the cross-head, a plunger provided with perforations through which the core-rods pass, a clutching mechanism for connecting and disconnecting the cross-head and plunger, a working cylinder, a piston in said cylinder connected with the plunger, a sliding knife adapted to cut off the material fed into the mold and to then form one side of the mold, a working cylinder for said knife, a piston in the knife-cylinder connected with the knife, and an open pipe connecting the ends of the two cylinders beyond the pistons, whereby the same power will operate both pistons, but will operate the knife-piston first, a ball-race adjacent to the exterior surface of the knife and friction-balls in said race upon which the knife rides, substantially as set forth.

14. In a molding-press, the combination of a mold, a cross-head adapted to carry the core-rods, core-rods fastened to the cross-head, a plunger provided with perforations through which the core-rods pass, a clutching mechanism for connecting and disconnecting the cross-head and plunger, means for reciprocating the plunger, a sliding knife adapted to cut off the material fed into the mold and then to form one side of the mold, means for reciprocating the knife, a ball-race adjacent to the exterior surface of the knife and friction-balls in said race upon which the knife rides, and a second plunger at the other end of the mold perforated so as to receive the ends of the core-rods when they are forced into operative position and means for forcing the second plunger against the material, and die-plates on the plungers, substantially as set forth.

15. In a molding-press, the combination with the molding-chamber and the compressing devices, of a feed-cylinder provided with a forming-die, adapted to form the material as it is being fed into the molding-chamber, the forming-die having an adjustable regulating-plate to regulate the size of the block fed in, substantially as set forth.

16. In a molding-press, the combination with the molding-chamber and the compressing devices, of a feed-cylinder provided with a forming-die, adapted to form the material as it is being fed into the molding-chamber, the forming-die having an adjustable regulating-plate to regulate the size of the block fed in and having a spreading device to spread the material in a vertical direction, substantially as set forth.

17. In a molding-press, the combination with the molding-chamber and the compressing devices, of a feed-cylinder provided with a forming-die, adapted to form the material as it is being fed into the molding-chamber, the forming-die having an adjustable regulating-plate to regulate the size of the block fed in and having a spreading device to spread the material in a vertical direction, and a measuring-roller between the forming-die and the mold, substantially as set forth.

18. In a molding-press, the combination with the molding-chamber and the compressing devices, of a feed-cylinder having the forming-die 43, provided with the regulating-plate 44, and means for adjusting the same, and with the spreading device 45, substantially as set forth.

19. In a molding-press, the combination of a mold, a cross-head adapted to carry the core-rods, core-rods fastened to the cross-head, a plunger provided with perforations through which the core-rods pass, a clutching mechanism for connecting and disconnecting the cross-head and plunger, means for reciprocating the plunger, a sliding knife adapted to cut off the material fed into the mold and then to form one side of the mold, means for reciprocating the knife, a ball-race adjacent to the exterior surface of the knife and friction-balls in said race upon which the knife rides, and a second plunger at the other end of the mold perforated so as to receive the ends of the core-rods when they are forced into operative position and means for forcing the second plunger against the material, and die-plates on the plungers, a feed-cylinder provided with a forming-die adapted to form the material as it is being fed into the molding-chamber, the forming-die having an adjustable regulating-plate and a spreading device to spread the material vertically, substantially as set forth.

20. In a molding-press, the combination of a mold, a cross-head adapted to carry the core-rods, core-rods fastened to the cross-head, a plunger provided with perforations through which the core-rods pass, a groove in each side of the plunger, pawls pivoted to the cross-head and adapted to engage in the grooves, levers connected with the pawls, weights on the levers tending to keep the pawls in engagement with the grooves and pistons working in suitable cylinders and connected with the levers for disengaging the pawls, a sliding knife adapted to cut off the material fed into the mold and then to form one side of the mold, means for reciprocating the knife, a ball-race adjacent to the exterior surface of the knife and friction-balls in said race upon which the knife rides, and a second plunger at the other end of the mold perforated so as to receive the ends of the core-rods when they are forced into operative position and means for forcing the second plunger against the material, and die-plates on the plungers, a feed-cylinder provided with a forming-die adapted to form the material as it is being fed into the molding-chamber, the forming-die having an adjustable regulating-plate and a spreading device to spread the material vertically, substantially as set forth.

21. In a molding-press, the combination of a cylinder 2, with its piston 3, the plunger 4 connected with the piston and the cross-head 5 carrying and supporting the core-rods 7, the die-plate 8 on the plunger, the pawls 13 pivoted on the cross-head, the levers 14 connected with the pawls, the weights 15, the piston 18 connected with the levers 14, the cylinder 19 in which the piston works, the grooves 20 in the plunger 4, the rest or support 21 for the cross-head, the knife 23, the piston 26 connected with the knife and working in the cylinder 27, the raceway 28, the friction-balls 30 adapted to move in the said raceway, clamping-plate 31 provided with the retaining-lip 32, the lower plunger 35 provided with the die-plate 37 and operated by a piston in the cylinder 38, feed-cylinder 39, the supply-ram 40 and means for operating the same, the forming-die 43 provided with the regulating-plate 44 and means for adjusting the same, and the spreading device 45 and the measuring-roller 50, substantially as set forth.

22. In a molding-press, the combination of a mold, a cross-head above the mold adapted to carry the core-rods, core-rods carried by the cross-head, a plunger below the cross-head provided with perforations through which the core-rods pass, a bottom plate provided with holes to receive the lower ends of the core-rods, means for forcing the cross-head, core-rods and plunger down toward the mold until the core-rods are brought into operative position with their lower ends projecting into the holes in the bottom plate, means for thereafter forcing the plunger farther down along the rods so as to compress the material, and a finishing-die forming the lower end of the mold, and conforming in shape to the shape of the block to be molded, substantially as set forth.

23. In a molding-press, the combination of a mold, a cross-head adapted to carry the core-rods, core-rods fastened to the cross-head, a plunger provided with perforations through which the core-rods pass, means for connecting and disconnecting the cross-head and plunger, and means for reciprocating the plunger, whereby the cross-head and plunger can be connected and together forced toward the mold until the core-rods are in position in the mold, and the cross-head and plunger can then be disconnected and the plunger forced into the mold so as to compress the material, and a finishing-die forming the lower end of the mold, and conforming in shape to the shape of the block to be molded, substantially as set forth.

In testimony whereof I have signed my name to this specification in the presence of two subscribing witnesses.

EDWARD H. CALLAWAY.

Witnesses:
EDWIN SEGER,
GEO. W. MILLS, Jr.